Oct. 25, 1932.  W. C. WOODSON, JR  1,884,951
MOTOR SPEED REGULATOR
Filed Dec. 30, 1930

Inventor
Wm. C. Woodson, Jr.

By
J. Kaplan
Attorney

Patented Oct. 25, 1932

1,884,951

UNITED STATES PATENT OFFICE

WILLIAM COWPER WOODSON, JR., OF BROOKLYN, NEW YORK

MOTOR SPEED REGULATOR

Application filed December 30, 1930. Serial No. 505,589.

This invention relates to a speed regulator for motors.

The principal object of the invention is to provide electro-magnetic means of novel character for maintaining the speed of a motor of any kind having or associated with a rotary element between predetermined limits wherein the slowing of the motor below the lower desirable limit will effect closing of an electric circuit and the speeding up of the motor beyond the upper desired limit will effect opening of the electric circuit, the opening and closing of the circuit effecting respectively the supply of motive force to the motor and the cutting off of such motive force either directly or indirectly through auxiliary control mechanism.

With the above and other objects in view, as will be hereinafter apparent, the invention consists in general of certain novel details of construction and combinations of elements hereinafter fully described, illustrated in the accompanying drawing and specifically claimed.

In the accompanying drawing like characters of reference indicate like parts in the several views, and Figure 1 is a diagrammatic view showing the device as used for directly closing and opening the circuit through an electric motor.

Figure 1:
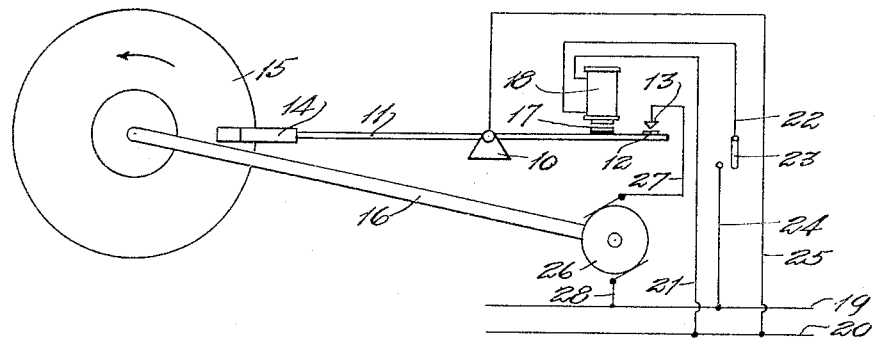
Figure 2:
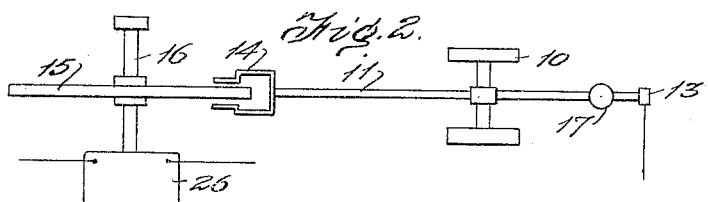
Figure 2 is a detail view of a certain rotary disk, a magnet and the supporting beam for the latter.

It is to be understood that the drawing accompanying this specification is more or less diagrammatic, no effort being made to illustrate those mechanical details of construction readily designed by any one skilled in the art.

It is also to be understood that the invention is not at all limited in its use to the particular embodiment herein shown and described. For instance, it is obvious that any device controlled by the speed of revolution of a shaft to open and close the circuit through an electric motor could be used to open and close any other electric circuit such as the sparking circuit for an internal combustion engine of the type wherein the charge is fired by an electric spark. Again, the closing of a circuit for any purpose by a light beam, photo-electric cell and shutter is also well known. When, therefore, such terms as "motor", "circuit closer" and the like are used herein it is to be understood that these terms are to be taken in their broadest sense and are not to be confined to the specific embodiments of such devices as herein disclosed.

In each of the forms here shown there is supported in bearings 10 a balance arm or lever 11 which carries a contact 12 movable by the swinging of the arm into and out of contact with the fixed contact 13. At its other end this arm carries a U-shaped magnet 14 straddling the edge of a disk 15 fixed on a shaft 16 driven from the motor whose speed is to be here regulated. While this shaft may be driven by a suitable means from such motor it is here shown as forming the motor shaft. Mounted on the lever 11 is an armature 17 wherewith cooperates an electro-magnet 18, the armature and magnet 18 being so arranged as to cause the contact 12 to close on the contact 13 upon energization of the magnet 18 unless such movement is resisted in a manner hereinafter described. Supply lines 19 and 20 are shown in each case and one terminal of the magnet 18 is connected to one of these supply lines by a conductor 21. A conductor 22 connects the other terminal of magnet 18 to a switch 23 which is in turn connected by a conductor 24 to the other supply line so that the closing of switch 23 effects energization of magnet 18. Also, a conductor 25 connects the lever 11 to one of said supply lines.

In the form of the invention shown in Figure 1 there is disclosed an electric motor 26 having one of its brushes connected by a conductor 27 with the contact 13 and its other brush connected by a conductor 28 with the supply line 19, the conductor 25 being connected to the other supply line 20.

Figure 3:
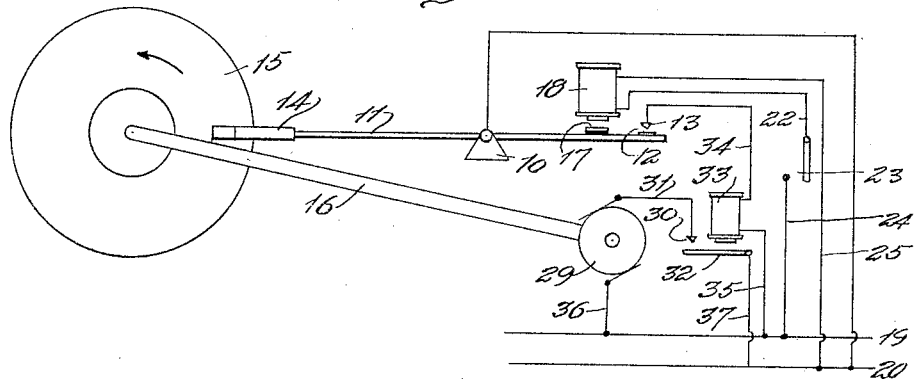
Figure 3 is a view similar to Figure 1 but showing the wiring for opening and closing a motor circuit by indirect means.

In the form of the invention shown in Figure 3, in which auxiliary control apparatus is provided for the electric-motor 29, one brush of this motor is connected to the fixed contact 30 of a relay by a conductor 31. This relay has the usual movable armature contact 32 controlled by a magnet 33. The magnet 33 has one terminal connected by a conductor 34 with the contact 13 and a conductor 35 connects the remaining terminal with a supply line. The remaining brush of motor 29 is connected by a conductor 36 with line 19 and a conductor 37 connects armature contact 32 with line 20.

Figure 4:
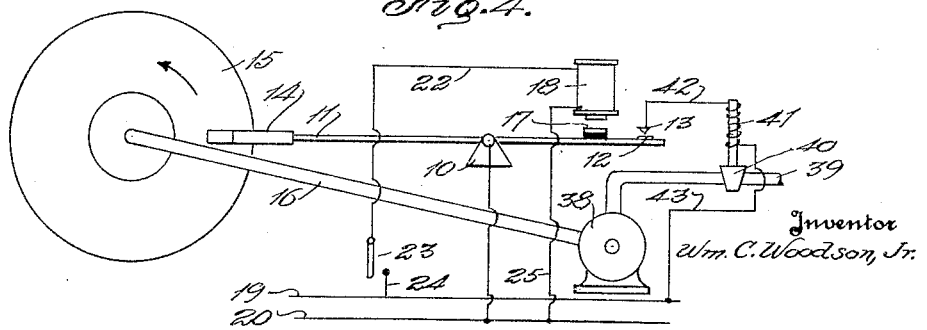
Figure 4 is a view, partly diagrammatic showing the device as used for regulating a steam or other fluid pressure motor.

In the form of the invention shown in Figure 4 a fluid pressure motor 38 receives its supply through a pipe 39 controlled by a valve 40. The core of a solenoid 41 is connected to this valve in such manner as to open the valve when the solenoid is energized. A conductor 42 connects one terminal of the solenoid with contact 13 and a conductor 43 connects the other terminal of the solenoid with the line.

It is to be noted that the magnet 14 and metallic disk 15 form a magnetic torque device, the arrows showing the directions in which the disks rotate. Under these conditions the action of this torque device tends to open the contact 12 from the contact 13. By properly proportioning the parts the magnetic torque may be made sufficient, upon the disk rotating at a predetermined speed, to overcome the pull exerted by the energized magnet 18 upon the armature 17. By this means, whenever the circuit is closed through magnet 18 and the motor which drives the magnetic torque device is below a predetermined speed or is at rest a circuit is closed which supplies power to the motor either directly as in Figure 1 or through auxiliary motor control means as shown by the relay of Figure 3 and the valve and solenoid motor control means shown in Figures 3 and 4 is merely typical of any one of a large variety of such means well known to those skilled in the art.

In operation the motor is started by closing the switch 23 to energize the magnet 18 which closes the circuit by which the operation of the motor is effected either directly or indirectly. When the speed of the motor exceeds the required limit this circuit opens temporarily whereupon the motor slows down and the circuit again closes. Consequently, the motor speed is regulated between desired limits and, by properly proportioning and adjusting the parts, the regulation may be made as close as desired.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

What is claimed, is:—

1. In a device of the kind described, a contact, a circuit closing arm mounted for oscillation to and from the contact, an electro-magnet urging said arm into engagement with the contact, a magnetic torque device tending to rotate said arm away from said contact and including a rotative element, a motor driving said rotative element, a source of electro-motive energy, circuit connections connecting the arm and contact in series with the source of energy and controlling the operation of said motor, said torque device being arranged to move said arm and open said arm from the contact against the action of said magnet upon the motor exceeding a predetermined speed and circuit connections for said electro-magnet including a manually operable switch adapted upon closing to energize the magnet and thereby effect closing of the motor circuit to start the motor by moving the circuit closing arm into engagement with said contact, said switch maintaining the magnet in energized condition when closed to thereby resist movement of the circuit closing arm by the torque device, the opening of said switch effecting breaking of the circuit through the motor by permitting free action of the torque device on the circuit closing arm.

2. In a device of the kind described, a contact, a circuit closing arm mounted for oscillation to and from the contact, an electro-magnet urging said arm into engagement with the contact, a magnetic torque device tending to rotate said arm away from said contact and including a rotative element, a motor driving said rotative element, a source of electro-motive energy, valve means governing said motor, electro-magnetic means governing said valve means, circuit connections connecting said arm, contact and last mentioned electro-magnetic means in series with the source of energy and circuit connections for said electro-magnet including a manually operable switch adapted upon closing to energize the magnet and thereby effect closing of the motor circuit to start the motor by moving the circuit closing arm into engagement with said contact, said switch maintaining the magnet in energized condition when closed to thereby resist movement of the circuit closing arm by the torque device, the opening of said switch effecting breaking of the circuit through the motor by permitting free action of the torque device on the circuit closing arm.

3. In a device of the kind described, a contact, a circuit closing arm mounted for oscillation to and from the contact, an electro-magnet urging said arm into engagement with the contact, a magnetic torque device tending to rotate said arm away from said contact and including a rotative element, a motor driving said rotative element, a source of electro-motive energy, said motor being an electric-motor, a relay controlled motor circuit, circuit connections connecting said arm, contact and source of energy in series and circuit connections for said electro-magnet including a manually operable switch adapted upon closing to energize the magnet and thereby effect closing of the motor circuit to start the motor by moving the circuit closing arm into engagement with said contact, said switch maintaining the magnet in energized condition when closed to thereby resist movement of the circuit closing arm by the torque device, the opening of said switch effecting breaking of the circuit through the motor by permitting free action of the torque device on the circuit closing arm.

In testimony whereof I affix my signature.

WILLIAM COWPER WOODSON, Jr.